United States Patent [19]
Rebers et al.

[11] Patent Number: 4,857,672
[45] Date of Patent: Aug. 15, 1989

[54] CABLE CLOSURE END CAP

[75] Inventors: Kenneth D. Rebers; William J. Seim, both of Austin; Dean C. Krenz, Round Rock, all of Tex.

[73] Assignee: Minnesota Mining and Manufacturing Company, St. Paul, Minn.

[21] Appl. No.: 193,736

[22] Filed: May 12, 1988

Related U.S. Application Data

[63] Continuation-in-part of Ser. No. 131,913, Dec. 11, 1987.

[51] Int. Cl.⁴ .......................................... H02G 15/013
[52] U.S. Cl. ................................. 174/93; 174/77 R; 174/92
[58] Field of Search ..................... 174/41, 77 R, 92, 93

[56] References Cited

U.S. PATENT DOCUMENTS

| | | | |
|---|---|---|---|
| 2,771,502 | 11/1956 | King et al. | 174/92 |
| 2,788,385 | 4/1957 | Doering et al. | 174/92 |
| 3,209,067 | 9/1965 | Channell et al. | 174/93 |
| 3,663,740 | 5/1972 | Dellett | 174/92 |
| 3,692,926 | 9/1972 | Smith | 174/92 |
| 3,816,642 | 6/1974 | Toedtman et al. | 174/138 F |
| 3,836,694 | 9/1974 | Kapell | 174/22 |
| 3,984,623 | 10/1976 | Worden | 174/93 X |
| 4,079,193 | 3/1978 | Channel | 174/138 F |
| 4,237,335 | 12/1980 | Giebel et al. | 174/93 X |
| 4,262,168 | 4/1981 | Bossard | 174/92 X |
| 4,387,268 | 6/1983 | Morel et al. | 174/92 |
| 4,424,412 | 1/1984 | Goetter et al. | 174/93 X |
| 4,486,620 | 12/1984 | Ball et al. | 174/41 |
| 4,492,816 | 1/1985 | Morel et al. | 174/92 |
| 4,581,265 | 4/1986 | Follette | 428/36 |
| 4,610,921 | 9/1986 | Follette | 428/304.4 |
| 4,701,574 | 10/1987 | Shimirak et al. | 174/93 |
| 4,704,499 | 11/1987 | Faust | 174/93 X |
| 4,711,975 | 12/1987 | Morel et al. | 174/92 |

FOREIGN PATENT DOCUMENTS

| | | |
|---|---|---|
| 1602657 | 2/1971 | France . |
| 2301119 | 9/1976 | France . |
| 56-63231 | 5/1981 | Japan . |
| 58-28434 | 6/1983 | Japan . |
| 913727 | 12/1962 | United Kingdom . |

OTHER PUBLICATIONS

G-A-T-M-5000 Series Aerial Terminal.
3M-Aerial Closure System.
Hawk (C-2350 Series) Communications Technology.

*Primary Examiner*—Morris H. Nimmo
*Attorney, Agent, or Firm*—Merchant, Gould, Smith, Edell, Welter & Schmidt

[57] ABSTRACT

A cable closure end cap arrangement is provided, to achieve a sealing between a cable splice closure, and a cable end in communication therewith. The arrangements according to the invention may be adapted to accommodate more than one cable extending into an end of a cable closure. Preferred arrangements comprise a composite of inner and outer members, each having a bore therein. Each bore is preferably defined by an arrangement of concentric rings, or a circular ridge/trough arrangement. The circular rings include transverse walls extending therebetween, in a preferred manner permitting an accordion-like flexibility. The accordion-like rings accommodate; cables of different sizes; cables at various angles relative to the end cap arrangement and the cable closure; and, movement of the cable closure, for example upon an aerial messenger wire. End cap arrangements according to the present invention are mounted by means of a slit in communication with each bore. The slits are preferably prepared by cutting slots formed in the end cap arrangement during manufacture. Preferred end cap arrangements are made from a rubber, or thermoplastic rubber material, for flexibility and long life.

31 Claims, 6 Drawing Sheets

CABLE CLOSURE END CAP

CROSS REFERENCE TO RELATED APPLICATION

The present application is a continuation-in-part of U.S. Ser. No. 131,913 filed Dec. 11, 1987.

FIELD OF THE INVENTION

The present invention relates to cable splice closures, in particular to end caps or to end seals which provide for a sealing relationship between cables and cable splice closures. The invention particularly concerns cable splice closures such as are frequently used in the telecommunications industry.

BACKGROUND OF THE INVENTION

Cables, such as telecommunication cables, may carry hundreds and sometimes thousands of pairs of insulated wires, enclosed within flexible shields or tubular sheaths. When two or more cable ends are joined together, as for example when extending a cable or when tapping into an extended cable, a splice or splice area is created. Generally, the splice area should be enclosed, for protection from the environment. For example, if the closure is an aerial closure, used with aerially suspended cables, protection against damaging interference from weather elements, animals, plants and so forth may be necessary or desired. If the enclosure is a buried enclosure, protection against ground water, burrowing animals, and soil interference is generally required.

Structures adapted for enclosing such portions of cables are frequently referred to as "splice closures". Such closures are typically adapted to enclose therein at least two, and sometimes more "cable ends". The term "cable end" and variants thereof, as used herein, refers to an area of exposure of insulated conductors, i.e., wires and any additional wrappings or coverings involved.

Splice closures, or cable closures, generally comprise an elongate, typically cylindrical, casing having first and second opposite ends. Cables to be joined at the splice area are generally directed into the casing through the casing ends. At each of the casing ends, seal means are generally required in order to ensure an environmental seal around the cables, i.e. between the cables and the cable enclosure.

Generally, a plurality of features are desirable in any preferred seal system or arrangement for use in association with cable closure ends. First, generally the seal system should be such that it can be readily mounted around, or removed from association with, a continuous cable system. That is, the cable cannot generally be threaded through a single aperture, rather the seal arrangement should be adapted for mounting about an already positioned cable or cable splice.

Secondly, preferably the seal system is appropriate for accommodating a variety of sizes of cables, so that it can be conveniently applied in the field. Also, it should, preferably, be capable of adjustment for various directions of extension of associated cables, for example non-coaxial, and/or non-parallel, cables extending into a cable splice. A related problem concerns movement of the cable closure, for example under high winds or the like. Again, it is preferred that the seal system be such as to accommodate such movement without substantial loss of the protective seal(s).

It is also preferred that the seal system be replaceable as necessary, for example to accommodate new cables, new cable sizes, or merely to ensure a good environmental seal over a long period of time.

Other desirable features and seal systems for cable splice enclosures concern features facilitating easy and convenient assembly, since often assembly is done in the field. Field assembly may occasionally be under adverse weather conditions, or difficult working conditions, for example in suspension from a ladder, bucket arrangement or the like. Preferably the seal system is such that standard-sized, easy-to-manufacture, parts can be utilized, each part being individually customizable or tailorable (post-manufacture) to suit a particular cable arrangement. Also, preferably the seal system should be such as can be readily manufactured from not only conveniently handled and readily available materials, but also materials which can withstand adverse environmental conditions.

The above is only a limited discussion of the many features desirable in a sealant system for cable closures. It will be apparent from the following descriptions that problems to be addressed and preferably overcome by such a system are numerous.

An end closure system for a cable splice enclosures is disclosed in U.S. Pat. No. 4,262,168. The system disclosed therein comprises a split washer system. According to the system, a composite end seal or washer comprises two mating half-washers, each offset along a diameter and slit along an offset radius. As a result of the slit, which communicates between an edge, the washer and central aperture, the washer can be placed over an already positioned cable. The system includes a plurality of concentric cut-out portions, to accommodate arrangements of various sizes. A cut-out portion or area is a section which can be cut open, by various means such as with shears or the like, for various reasons.

While the system of No. '168 is highly advantageous for many applications, it is not readily adaptable to systems involving a plurality of cables. Further, this system generally appears to require use of a mastic sealant, or tape, in association therewith, to achieve a good seal. Further, the system does not readily accommodate cable movement, non-coaxial alignment, or cable alignment not along a longitudinal axis of the closure.

A conical enclosure is disclosed in U.S. Pat. No. 4,486,620. A plurality of cables is accommodated, through the utilization of a plurality of cones. Each cone has a deformable, external, longitudinal rib, to provide snug engagement with a cable. While this arrangement also has its advantages, it does not appear to be convenient to assemble and, further, it is not apparent that it is appropriate for substantially universal application. That is, the cones apparently cannot be readily adapted to a wide variety of cable sizes, even though a small amount of adjustment can apparently be accommodated by the flexible longitudinal rib. Further, the arrangement does not appear particularly convenient to assemble and place in position.

U.S. Pat. Nos. 4,581,265 and 4,610,921 disclose wrap-around closure systems. The particular systems shown utilizes a fabric system that has conical ends tightly closed by means of: zippers; hook and loop closure systems; or the like.

Other splice closure systems are disclosed in U.S. Pat. Nos. 3,209,067; 3,816,642; and 4,079,193. All three illustrate attempts at addressing some of the above relating concerns.

None of the previously available arrangements for providing end seals have been satisfactory with respect to addressing the above related problems and concerns. What has been needed has been a convenient and satisfactory system.

OBJECTS OF THE INVENTION

The objects of the present invention include the provision of an end cap arrangement utilizable to provide end seals in a cable closure or the like.

It is another object to the invention to provide a preferred end cap arrangement particularly well-adapted for use in aerial closure systems.

It is another object to the invention to provide. an end cap arrangement including means readily accommodating: more than one cable extending therethrough; cables of different sizes; cables of different angles of orientation and extension relative to the closures; closures of various types including hardshell closures; closure movement; and, inclement weather conditions.

It is another object of the present invention to provide a preferred end cap arrangement which is relatively easy to manufacture, assemble and place in an operation, and which is otherwise particularly well-adapted for its proposed usages.

Other objects and advantages of the present invention will become apparent from the following descriptions, taken in connection with the accompanying drawings, wherein are set forth by way of illustration and example certain embodiments of the present invention.

SUMMARY OF THE INVENTION

The present invention concerns end seal arrangements for cable splice closures or the like. A cable splice closure generally comprises an elongate casing positionable around portions of a cable arrangement, particularly a cable splice whereat two or more cable ends are brought together. In the telecommunications industry such arrangements generally involve 2 or more cables, the ends of which are brought, and spliced, together at a cable splice. The splice may involve hundreds or thousands of individual wire ends, spliced to one another.

Cable splice closures are generally needed for both aerial and buried cable systems. While the present invention is utilizable in both types of environments, it is particularly well-adapted for use with aerial closures. Aerial closures are closures which, in use, are suspended from a messenger wire, support cable or the like, above the ground.

Seal arrangements of concern to the present invention comprise end cap arrangements for splice closures. End cap arrangements according to the present invention preferably comprise a relatively soft rubber, or thermoplastic rubber, wall member readily deformable to form a good, tight, environmental seal with respect to cables or the like extending therethrough, and cable enclosures or the like extending around an outer edge thereof. For the preferred embodiment, an end cap arrangement wherein the wall member comprises a composite of first and second members is provided in association with each of opposite ends of a hardshell cable enclosure. End cap arrangements including features and advantages according to the present invention may be utilized in a variety of shapes or designs of enclosures, as will be understood from the detailed description.

In general, the wall member includes at least one longitudinal cable bore therein. Each cable bore is defined by a plurality of substantially concentric ring members spaced from one another by transverse wall sections. The transverse wall sections are positioned generally centrally along a longitudinal extension of the associated ring members and bore, to define a ridge/trough arrangement including ridges directed toward both of opposite longitudinal directions from the transverse wall sections. The transverse wall sections on opposite sides of each associated ring member are longitudinally spaced from one another to form a discontinuous central wall extending through the concentric ring members, but oriented substantially normal thereto. The result is a flexible, accordion-like, seal system defined by the concentric rings and adapted for flexible sealing with cables of various sizes and angles of extension.

Mounting means providing convenient mounting on cables is provided. Generally, the mounting means comprises a slit arrangement provided in association with each bore. The slits may be formed during molding, or they may be formed by cutting a molded non-slit arrangement. It is noted that each bore may be occluded by a cut-out portion during manufacture and before use. Also, unused bores, if any, may be left so occluded.

Preferably anchor means are provided to facilitate mounting in an associated enclosure. For example, mounting ears on the wall member may be used to engage a mounting recess in an associated enclosure by means of a friction fit.

Also preferably, the transverse wall members define first and second sets of transverse wall members: with all members of the first set of transverse wall members being aligned substantially co-planar with one another, and in a first plane normal to the ring members; and, with all members of the second set of transverse wall members aligned substantially co-planar with one another, in a second plane parallel to the first plane, but axially off-set therefrom with respect to the axis of the ring members. This generates a preferred, flexible, sealing system.

As indicated previously, preferred embodiments involve wall members formed by first and second members positioned against one another along an interface surface.

Preferably, the first and second members, or right and left members, of each end cap are formed in a manner matable with one another, to facilitate sealing and assembly. Further, preferably each includes a mounting ear or the like, by which an associated enclosure can be engaged. As a result of such mounting ears, secure attachment to a casing, in a preferred orientation, may be ensured. For preferred embodiments, the mounting ear arrangement is such that problems of having the end cap members becoming unintentionally dislodged from an association with an open, suspended, aerial closure are minimized.

End cap arrangements according to the present invention may include a single aperture or bore therein for accommodation of a single cable, or plurality of apertures or bores therein, for accommodation of a plurality of cables. In addition, auxiliary cut-out areas may be provided, to selectively accommodate auxiliary wires or the like. That is, a cut-out area can be selectively cut open, to provide for extension of a wire therethrough.

Again, in preferred embodiments each cable bore comprises a series of concentric sidewalls or ridges, attached to one another by the central transverse wall sections. Means are provided to facilitate removal of selected ones of the concentric sidewalls, to permit adjustment to different sized cables.

For preferred embodiments wherein each end cap comprises first and second members a preferred arrangement of engagement is provided so that the above described geometry of concentric sidewalls and transverse walls is readily achieved. Viewed from either face, the result is an end cap arrangement having a bore (or bores) defined by alternating concentric troughs and ridges; i.e. having a preferred ridge/trough arrangement.

As indicated above, for mounting, each bore in each end cap member is split, by means of a cut line or slit extending to the bore and communicating with an outer edge of the end cap member. This facilitates mounting upon a cable or the like, without the need of threading the cable through the bore. It will be understood from the detailed descriptions that should the end cap member include more than one cable bore and be mounted on more than one cable, it will generally include more than one such cable bore slit. The slits may be formed during molding, or they may be cut after molding and before installation.

Again, each cable member bore extends through the center of a relatively soft arrangement of concentrically aligned ridges and troughs, as described. This provides a flexible system which can be easily cut-out to accommodate cables of various sizes. Further, as a result of the flexibility a good sealing effect can be readily achieved. The alternating ridges are preferably separated such that adjacent troughs are not of the same depth, due to the arrangement of transverse wall sections, which define the depth of the troughs. The result is a conduit or bore arrangement which, in cross-section, does not have a single substantially continuous vertical wall extending throughout. That is, the concentric ridges or rings are attached to one another by an undulating and/or discontinuous wall. As a result of this, an increase in flexibility to accommodate cables of various diameters or alignments is achieved. Further, some cable movement during operation is accommodated.

Preferably, each end cap member bore extends through a portion of the end cap comprising a plurality of oppositely directed extensions, which form the alternating ridges and troughs. For substantially every extension toward an inside portion or face of each end cap member, there are two concentric extensions directed to an outside portion of the end cap member. The inside extensions, it will be observed from the detailed descriptions, generally each comprise an opposite side of each transverse wall section or trough between outside extensions. This arrangement facilitates an overall system in which the cross-section does not have a single continuous vertical wall between concentric rings, as described above. Also, it provides for preferred mating with an associated end cap member.

For preferred embodiments, mating end cap members are brought together with an inside surface of each end cap member oriented toward an inside surface of the associated end cap member. Preferably, ridge members on inside surfaces of mating end cap members are oriented such as to mate, or interlock, with one another to provide an overall preferred seal arrangement, as described in detail below.

For the preferred embodiment, each end cap member includes cut-out portions therein, which can selectively be cut-out to accommodate auxiliary wires or the like, for example ground wires associated with a cable splice arrangement; the cut-out portions of adjacent cap members generally overlapping one another.

The end caps thus far described, are generally analogous to those of the parent application, Ser. No. 131,913. Preferred end caps according to the present invention include these features but differ in two significant manners. First, when formed the preferred end cap members are not completely split along a line extending from an exterior circumferential portion thereof, to a portion of each bore. Rather, preferably, each split comprises a slot or trough extending from a position adjacent the exterior of the cap member, to an associated bore. These troughs comprise thin walled areas of end cap material, which can be readily cut in the field. The troughs provide guides for the cutting operation. It is noted that the troughs do not communicate completely between opposite faces of the end cap members.

Also, unlike the troughs shown in the drawings of the parent application, U.S. Ser. No. 131,913, slits formed in end cap members according to the preferred embodiment of this specification communicate from the exterior of each end cap member to an internal bore along the line extension substantially off set from extension to the center bore. This will be apparent from comparison of the figures presented, and results in advantages. In particular, a more secure, weather-tight, seal is ensured. A reason for this is that slots, or slits, in each member of a pair of end cap members are oriented such that when the members of the pair of end cap members are mated to one another, the slits in each end cap member do not cross one another even at their termini, and preferably do not terminate at the same point along the axis of the rings defining the bores. This will be better understood from the following detailed descriptions.

The drawings constitute a part of this specification include exemplary embodiments of the invention, which may be embodied in various forms. It is to be understood that in some instances relative component sizes, and material thicknesses, may be shown exaggerated to facilitate an understanding of the invention. It is noted that FIGS. 1-12 represent the disclosure of the parent application, Ser. No. 131,913.

BRIEF DESCRIPTION OF THE DRAWINGS

FIG. 1 is a fragmentary, environmental, perspective view of an aerial splice closure including in association therewith an end cap arrangement according to the disclosure of the parent application.

FIG. 2 is an enlarged, fragmentary, cross-sectional view taken generally along line 2—2, FIG. 1, and showing an end cap arrangement according to the parent application in side elevation.

FIG. 2A is an elevational view of a cable member arrangement according to the parent application; FIG. 2A generally corresponding to FIG. 2, but without the environment of the closure shown.

FIG. 7 is a rear elevational view of an end cap member according to the parent application; FIG. 7 being a generally rear side view of the item shown in FIG. 6.

FIG. 10 is a rear elevational view of a right side cap member according to the parent application; FIG. 10 being generally an opposite view of the member depicted in FIG. 9.

FIG. 11 is an elevational view of the member depicted in FIGS. 9 and 10; FIG. 11 being from a viewpoint generally analogous to that indicated by line 11—11, FIG. 9.

THE EMBODIMENT OF THE PARENT APPLICATION

Figures 1, 2, 2A:
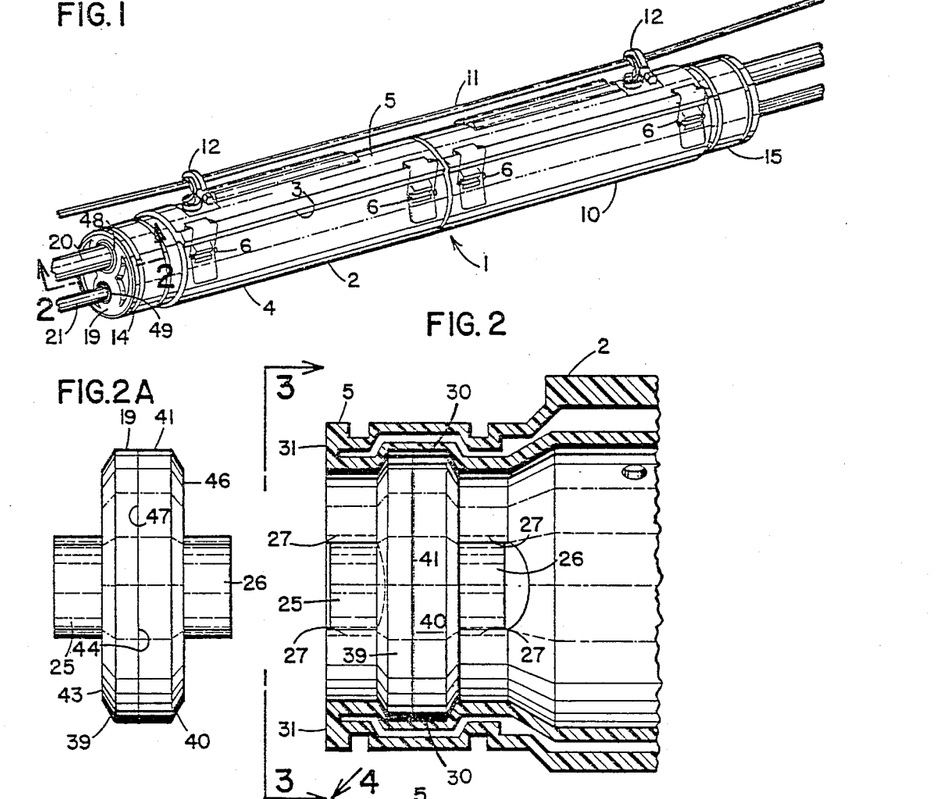

The reference numeral 1, FIG. 1, generally designates a splice closure in which an end cap arrangement according to the parent application is utilized. It will be understood from the details described herein that an end cap arrangement involving features according to the disclosure may be utilized in a variety of closure systems, splice closure 1 merely providing an exemplary environment. Splice closure 1 generally comprises casing 2 openable along a seam 3, for access to an interior thereof. Generally, casing 2 includes a hinge, out of view, so that a bottom half 4 can be swung away from a top half 5, when opened. Latches 6 provide for secure closure, when desired.

Generally, casing 2 is preferably formed from relatively hard material such as plastic or metal. Preferably casing 2 is made of plastic, so that: it is readily formed; and, is substantially resistant to damage from the environment.

The particular splice closure 1 illustrated in FIG. 1 is an aerial splice closure 10. That is, the closure 10, in use, is suspended from an aerial cable 11, typically referred to as a messenger wire.

A variety of means may be utilized to effect mounting upon support cable or messenger 11. For the embodiment described and shown, mounting is accomplished by a hanger means comprising hanger members 12. Generally, for aerial splice closures 10, electrical conduction means is provided so that aerial messenger wire 11 can be utilized as a ground, to protect a cable splice enclosed within the closure 1. For the embodiment illustrated, this is provided by the hanger members 12.

Still referring to FIG. 1, splice closure 1 is generally cylindrical and has first and second ends 14 and 15 respectively. For the embodiment shown, ends 14 and 15 are substantially identical, but are directed oppositely to one another. There is no absolute requirement, however, that they be so, in order to take advantage of certain features of the invention.

For the embodiment shown, an end cap arrangement is positioned in each of the ends 14 and 15. Referring to end 14, which is in view, end cap arrangement 19 is provided, through which cables 20 and 21 extend. Cables 20 and 21, it will be understood, extend to a cable splice, not shown, enclosed within the splice closure 1.

End cap arrangement 19, depicted in detail in FIGS. 2 through 11, is adapted to accommodate two cables, 20 and 21, passing therethrough. It will be understood, especially by reference to the alternate embodiment of FIG. 12, that end cap arrangements according to the present disclosure can be developed to accommodate various other numbers of cable members, including a single cable member only, or some other number.

Still referring to FIG. 1, the purpose of end cap arrangements such end cap arrangement 19 is generally to provide an environmental seal about cables, such as cables 20 and 21, extending therethrough and into the closure 1.

Preferred end cap arrangements, such as end cap arrangement 19, according to the present disclosure are not formed integral with the casing 2. That is, they are generally removable therefrom and replaceable therein. An advantage to this is that good seals may be obtained for cables of various shapes, sizes, directions of extension etc. Generally, end cap arrangements according to the present invention are formed from a relatively soft rubber, or highly rubberized, material; an example of a suitable material being a thermoplastic rubber having a durometer between 64 to 80, Shore A hardness and including a small quantity of a lubricant. A specific example is a thermoplastic rubber from Monsanto Chemical Co., Akron, Ohio, sold under the trademark Santoprene.

Such relatively soft materials, when used for the end cap arrangement 19, are capable of flexing under stress during use, especially to accommodate movement of the cables relative to one another without substantial loss of seal.

The end cap arrangement 19, of a preferred embodiment of the present disclosure, is mounted in casing 2 in such a manner that it is retained in position, even when the casing 2 is opened along seam 3. Referring to FIG. 2, the end cap arrangement 19 is shown positioned in the top half 5 of casing 2. The particular end cap arrangement 19 depicted includes an anchoring means comprising first and second oppositely positioned and extending mounting ears 25 and 26. The mounting ears 25 and 26 are received within and behind opposite tabs 27, in the casing 2. As a result of being positioned behind tabs 27, the mounting ears 25 and 26 tend to retain the end cap arrangement 19 suspended and locked in an appropriate position, within the casing 2, even if the casing 2 is opened along seam 3. For preferred embodiments, the mounting ears 25 and 26 are formed from a relatively soft rubber material, and a snap-fit or friction-fit arrangement is utilized to accommodate locking.

Also referring to FIG. 2, it will be understood that end cap arrangement 19 is snugly received within a recess 30 in a casing 2, to facilitate secure mounting without substantial likelihood of end cap arrangement longitudinal movement; i.e., movement along a longitudinal axis of casing 2. This is readily understood by comparison of FIGS. 2 and 2A, FIG. 2A showing the end cap arrangement 19, of FIG. 2, not associated with the casing 2.

Figure 3:
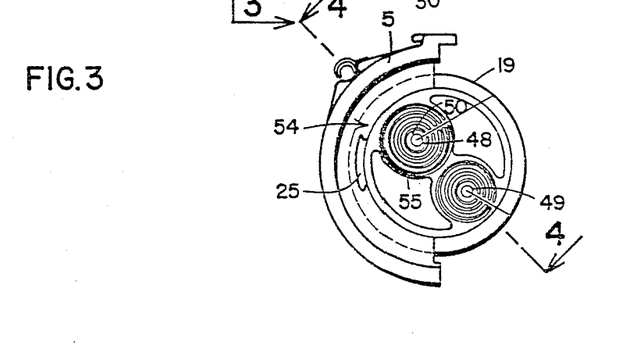
FIG. 3 is a fragmentary, end elevational view, taken generally along line 3—3, FIG. 2, with phantom lines indicating certain portions hidden from view.

Referring to FIGS. 2 and 3, the end cap 19 is received within the casing 2, behind outer lip 31, in a manner which provides a good sealing arrangement. The lip 31 results from recess 30.

For the preferred embodiment, the end cap arrangement 19 includes two separable members or sections 39 and 40, mated to one another generally along phase line or interface 41, FIG. 2A. Member 39 is referred to herein as the "left" member; with face 43 being referred to as the outer face, and face 44 the inner face, of the left member 39. Also, generally, member 40 is referred to herein as the "right" member; with face 46 being the outer face, and face 47 being the inner face, of right member 40. The terms "left" and "right" when used in reference to member 39 and 40, generally refer to orientation during use, i.e. whether the member is on the right or left of the other to a user opening the bottom half 4 of the closure, and looking at the edges of the members. The terms "inner" and "outer" when used with respect to opposite faces of the members 39 and 40, generally refer to whether the face is directed toward a mating member, or away from a mating member, during use. The terms "inner", "outer", "right" and "left" as used herein are meant only to refer to relative positions and/or orientations, for convenience, and are not to be understood to be in any manner otherwise limiting.

Referring to FIGS. 1 and 3, the end cap arrangement 19 of the embodiment shown includes a pair of bores 48 and 49. When used, bores 48 and 49 extend completely through the end cap arrangement 19, for passage of cables therethrough. When the end cap arrangement 19 is constructed, however, bores 48 and 49 may be blocked or occluded by relatively thin cut-out pieces of material. It will be understood, by reference to all Figs., that various numbers of bores may be extended through end cap arrangements 19 according to the present invention. The embodiment depicted in FIGS. 1 through 11 is an arrangement having two bores, since two bores are necessary to accommodate the pair of cables 20 and 21 depicted in FIG. 1. Alternate arrangements may be utilized in various applications.

Advantages are derived from this specific nature of the bores, 48 and 49. Again, each bore 48 and 49 extends, when used, completely through end cap arrangement 19. That is, each half 39 and 40 includes a pair of bores therein, the bores generally overlapping and mating with, in a substantially co-axial manner, an appropriate bore in the adjacent section. This will be understood by reference to FIGS. 4 and 5.

Figure 4:
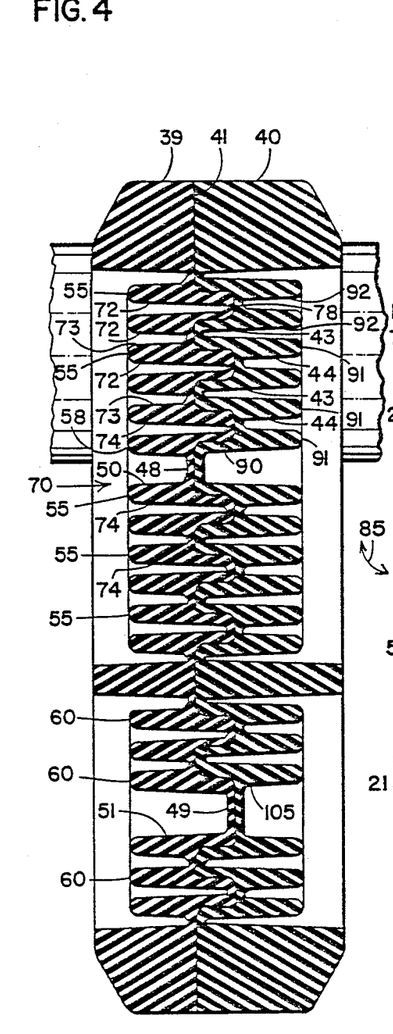
FIG. 4. is an enlarged, fragmentary, cross-sectional view of an end cap arrangement according to the parent application, taken generally along line 4—4, FIG. 3.

Referring to FIG. 3, it is noted that bore 50 forms that portion of bore 48 in member 39 and is generally centrally located in an arrangement 54 of concentric rings or sidewalls 55. Referring to FIG. 4, each sidewall 55 is defined by a ridge/trough arrangement. It is noted that in FIG. 4 bore 50 is shown closed, i.e. not yet cut-out for use to extend the cable therethrough.

A variety of numbers of the concentric rings 55 can be cut out of bore 50 by shears, scissors or the like, to accommodate cables of various sizes. Comparing FIG. 4 to FIG. 5, for example, it will be understood that in adapting section 39 for use in FIG. 5, the innermost ring 58 of the concentric rings 55, FIG. 4, has been substantially completely removed to accommodate the relatively large diameter cable 20. In this manner, an end cap arrangement 19 according to the present invention can be adjusted in size to accommodate various cables.

Figure 5:
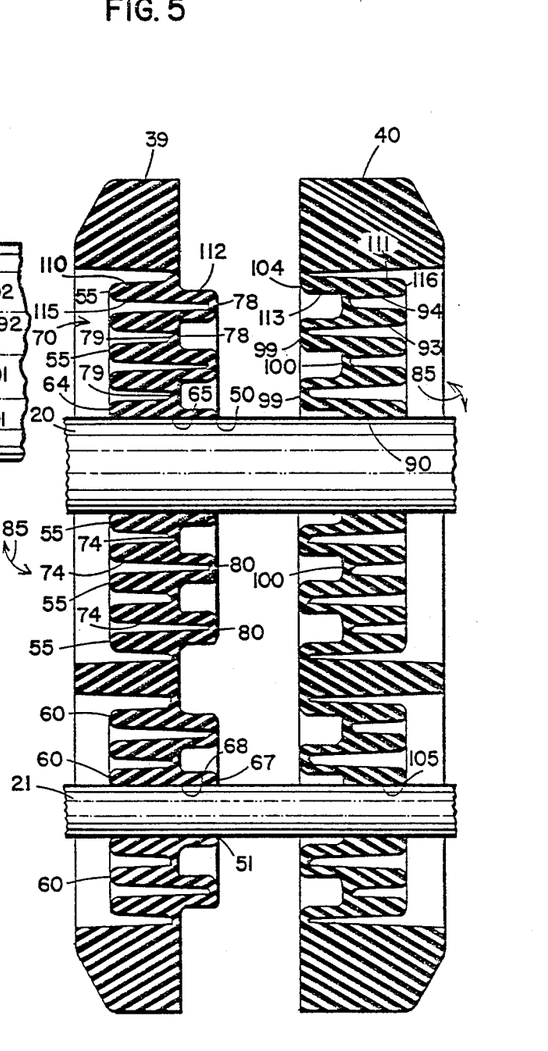
FIG. 5 is an enlarged, fragmentary, exploded view of the arrangement shown in FIG. 4; and, illustrating a pair of cables extending therethrough.

Also upon examination of FIGS. 3, 4 and 5, it will be understood that bore 51 forms that portion of bore 49 in member 39. Bore 51 is similarly constructed, and operates in a similar manner, to bore 50, with concentric rings 60 formed from a plurality of alternating ridges and troughs, in a ridge/trough arrangement.

A comparison of the cross-sections of bores 50 and 51, in FIGS. 4 and 5, leads to a recognition that the two bores 50 and 51 are not shown having the same numbers of concentric rings or ridges, i.e., ridges 55 and 60 respectively. From this it may be readily understood that a variety of numbers of concentric ridges can be utilized in defining bores of end cap arrangements the illustrations of FIGS. 3, 4 and 5 merely providing examples. Generally, the numbers of concentric rings or ridges will be dictated by such concerns as the number of cables likely to be passed through the arrangement 19, and the various sizes of cables that it is believed the arrangement 19 should be adapted to accommodate, in the field.

As will be understood from the following further descriptions, and the drawings, the particular ridge/trough arrangement illustrated provides substantial advantages in use. Generally, it will be desired to have a sufficient number of ring members, such as ring members 55 or 60, present so that even if several inner ridges are cut out to accommodate a large diameter cable, sufficient ring members are left to yield many of the advantages of the preferred ridge/trough arrangement, yet to be described.

Referring to FIG. 5, the innermost ring 64, about bore 50 in use, due to the ridge/trough or concentric ring arrangement provides an elongate surface 65, to seal over a relatively wide portion of cable 20. Due especially to construction from relatively soft material, and in the preferred geometry described, surface 65 is, in use, compressed against cable 20 to provide a substantial, elongate, relatively tight, centrally located, environmental seal. A similar observation is made with the respect to innermost ring 67 of bore 51, and the surface 68 thereof.

Still referring to FIGS. 4 and 5, the unique ridge/trough arrangement, generally designated at reference numeral 70, will be understood. In particular, between each ridge or ring, for example rings 55 associated with bore 50, there is a trough 72. The troughs 72 may be viewed as divided into two sets of alternating troughs 73 and 74, troughs 73 being shallower than troughs 74. Interconnecting the entire arrangement is an arrangement of vertical or transverse wall sections 78, generally divided into alternating segments 79 and 80. Segments 79 generally define and represent the bottoms of shallow troughs 73, and segments 80 generally define and represent a bottom wall of deeper troughs 74. The result is an overall wall 78 which does not have a continuous planar extension throughout. Rather, wall 78 is defined by two longitudinally off-set groups of segments 79 and 80; for the preferred embodiment segments 79 being substantially co-planar with one another and segments 80 being substantially co-planar with one another, two planes being off-set but both substantially centrally located along a longitudinal extension of bore 48. It is noted that both planes extend substantially perpendicular or normal to a direction of longitudinal extension of the ring members 55 or bore 48.

Advantages from this arrangement will be understood by reference to FIGS. 4 and 5, and the following. The absence of a single substantially continuous vertical (or transverse) wall permits an accordion-like collapse, of rings or walls 55, or some of rings 55, toward one another as a cable, for example, cable 20, is extended therethrough. Thus, a relatively tight pressure seal can be provided in the area of surfaces 65, FIG. 5. Further, the absence of a substantially continuous vertical wall, i.e., the absence of a wall not provided with off-set sections as illustrated in FIGS. 4 and 5, permits accommodation of cable 20, even when the cable 20 is directed through the bore 50 in a manner of off-set alignment, i.e., not substantially perpendicular to end cap section 39. That is, off-set extension of, or movement of, cable 20 relative to section 39 in the general directions of arrows 85, FIG. 5, can be readily accommodated.

Numerous advantages result from this. For example, a rocking movement of enclosure 1 on messenger wire 11, in high winds or the like, can be accommodated since the seal, with the accordion-like walls, or discontinuous transverse walls, can adjust. Further, cable such as cable 20 need not be brought directly into enclosure 1 from a direction perfectly perpendicular to end cap 39, in order to achieve a good seal, rather some varying angles from perpendicular can be accommodated. Also, the arrangement of alternating troughs and ridges facilitates cutting out various ridges as necessary to accommodate cables of various sizes, compare for example, FIGS. 4 and 5. The central positioning of sections 78 accommodate flexing in both directions indicated by arrow 85, as well as in other directions.

Referring to FIG. 4, it will be understood that member 40 has a similar construction. For example section 40 includes main bore 90 (a portion of through bore 48 in the overall arrangement), oriented to be aligned with bore 50. Bore 90 is surrounded by concentric rings or ridges 91. The ridges 91 are separated by troughs 92, which may be viewed as divided into alternating deep troughs 93 and shallow troughs 94, defined by transverse wall segments 99 and 100. The result is formation of a discontinuous vertical wall 101 of longitudinally off-set segments 99 and 100; segments 99 forming the bottom or back walls of deep troughs 93, and segments 100 forming the bottom or back walls of shallow troughs 94.

The preferred mating relationship for the inside section 40 and the outside section 39 will also be understood by reference to FIGS. 4 and 5. In particular, the preferred design is such that while the bores 50 and 90 overlap, the shallow troughs of one side are oriented directed toward the deep troughs of the other side, and vice versa. The result is an overall arrangement of concentrically aligned sidewalls or ridges attached to one another by transverse wall segments; the transverse wall segments generally not all being co-planar, but rather being divided into alternating sets of segments offset slightly from one another, along a longitudinal extension of a central axis for the associated bore. This generates a preferred arrangement having the flexibility characteristics previously described. In other words, interface 41 preferably extends through the discontinuous wall formed by cooperating members 39 and 40.

Referring still to FIGS. 4 and 5, it will be understood that a second bore 105 of inside section 40 is similarly constructed.

Mating of the two pieces to one another, for the embodiment shown, results from features illustrated in FIG. 5 that generally concern the concentric rings. In particular, the deeper troughs of each end cap member, and the bottom walls (or transverse wall segments) associated therewith, can be received within spaces formed behind the shallow troughs of the other end cap member, and the bottom walls thereof.

In order to achieve substantial uniformity in strength and thickness of ridges, it is noted that sections of the ridges are formed such as to be approximately half as thick as other sections. When the members 39 and 40 mate together, an overall arrangement of ridges or rings having relatively uniform thicknesses is provided. This is illustrated in FIG. 5, for example, by rings 110 and 111; ring 110 being in member 39 and ring 111 in member 40. Each ring 110 and 111 includes an internally directed section, 112 and 113 respectively. Sections 112 and 113 are approximately half as thick as outer sections 115 and 116 of the rings. Section 112 and 113, however, are oriented such that during mating, FIG. 4, an overall thickness approximately equal to that of sections 115 and 116 is provided.

It is noted that for the preferred embodiment the rings do not have a substantially constant thickness of cross-section throughout their entire extension across arrangement 19, but rather each has a slightly wider central portion than end portion. This generally facilitates construction of each of members 39 and 40 by methods such as molding or the like.

It is noted that other means may be provided to facilitate mating of the pieces. For example, a pin and aperture arrangement is formed in an area within the peripheral rim 125 of the arrangement 19, FIG. 7 and 10. Specifically, a pin 126 is mounted in member 39, and a recess 127 is formed in member 40. The pin 126 is provided with a wide section, 128, to facilitate an interference fit with recess 127.

Figure 6:
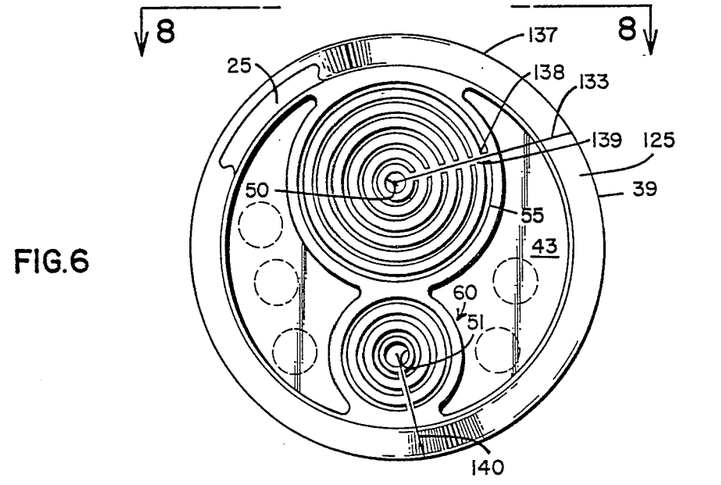
FIG. 6 is a front elevational view of a member of an end cap arrangement according to the parent application; the member depicted being a left side end cap member as shown in FIG. 4.

Other features, of end cap arrangements 19 according to this disclosure, may be understood by examination of FIGS. 6 through 11. Referring to FIG. 6, end cap section 39 is shown in front elevation, i.e. surface 43 is viewed. Bores 50 and 51 are readily viewable, each centered within its arrangement of concentric rings 55 and 60. Further, mounting ear 25 is readily viewable.

Figure 7:
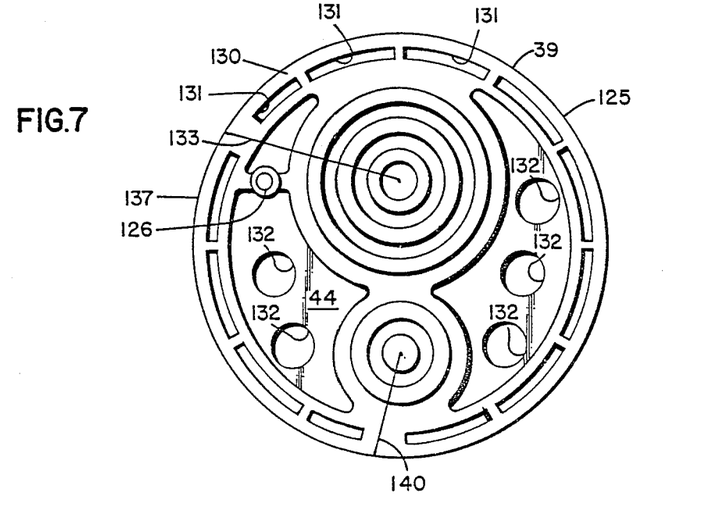

Referring to FIG. 7, a backside or internal surface 44 of section 39 is viewable. It is noted that along an outer annular section 130 of the inner surface 44, section 39 includes troughs 131. Troughs 131 generally lead to a lighter, more flexible, arrangement. Further, surface 44 is shown with a plurality of bores 132 therein. Bores 132 do not, in normal use, extend completely through section 39. However, they represent relatively thin sections of the material from which member 39 is formed. These sections can be readily cut-out if desired, to open an auxiliary bore. That is, a worker can cut-out one or more of sections 132 to extend auxiliary wires therethrough if desired. It will be understood, especially from examination of FIGS. 9, 10 and 11, that the mating section 40, of arrangement 19, contains similar cut-out sections therein.

Figure 8:
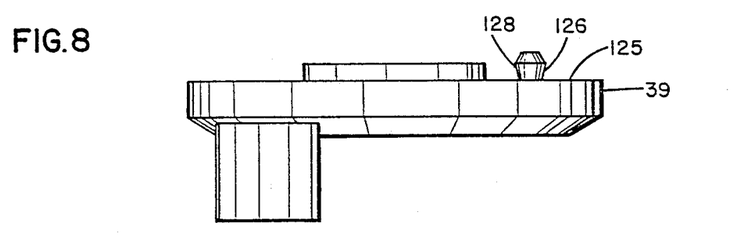
FIG. 8 comprises a side elevational view of the member shown in FIGS. 6 and 7, taken generally from the orientation indicated by line 8—8, FIG. 6.

It is noted that in FIG. 8 a side elevational view of the member illustrated in FIGS. 6 and 7 is shown.

Referring still to FIGS. 6 and 7, means for mounting section 39 in association with an elongate cable will be understood. In particular, line 133, FIG. 6, represents a cut line or slit extending from an outer periphery or edge 137 of section 39 to the center of bore 50. Cut line 133, continues through an entire thickness of section 39. As a result of slit 133, section 39 can be spread open or twisted, to fit around a cable member. It is noted that each trough is provided with an end area or wall 138, in the vicinity of cut line 133. That is, cut line 133 extends through a section 139 of continuous material in member 39. In a similar manner cut line 140 communicates with bore 51. It will be understood that a slit can be associated with any and all bores of a member such as member 39 that are to be fit around a cable in a snug manner. The slits may be molded into the end cap members, or they may be cut after molding and prior to installation.

Figure 9:
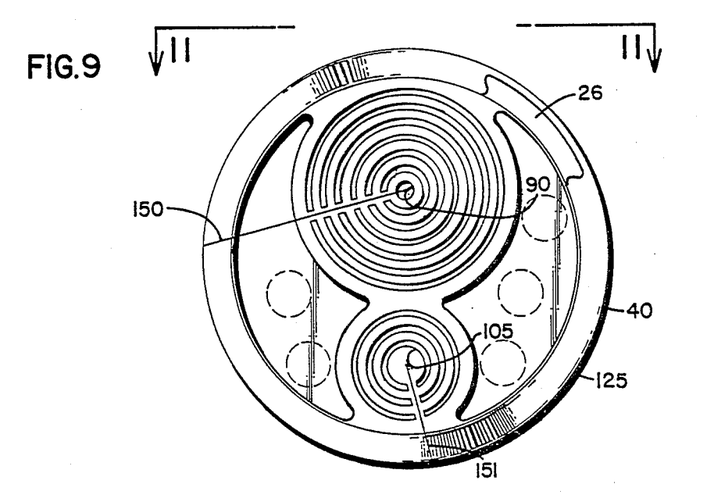
FIG. 9 is a front elevational view of an end cap member according to the parent application; the member of FIG. 9 being a right side member, as shown in FIG. 4.
Figure 10:
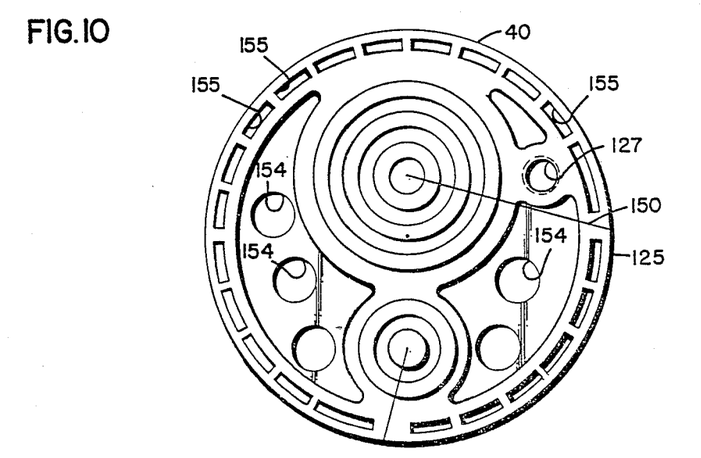
Figure 11:
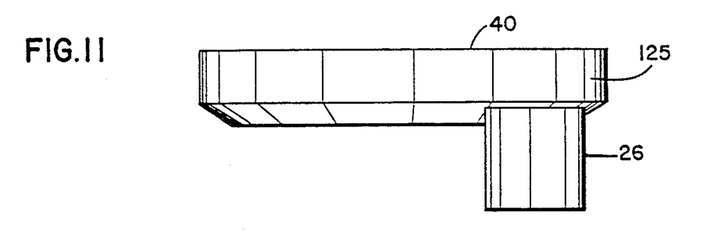
Figure 12:
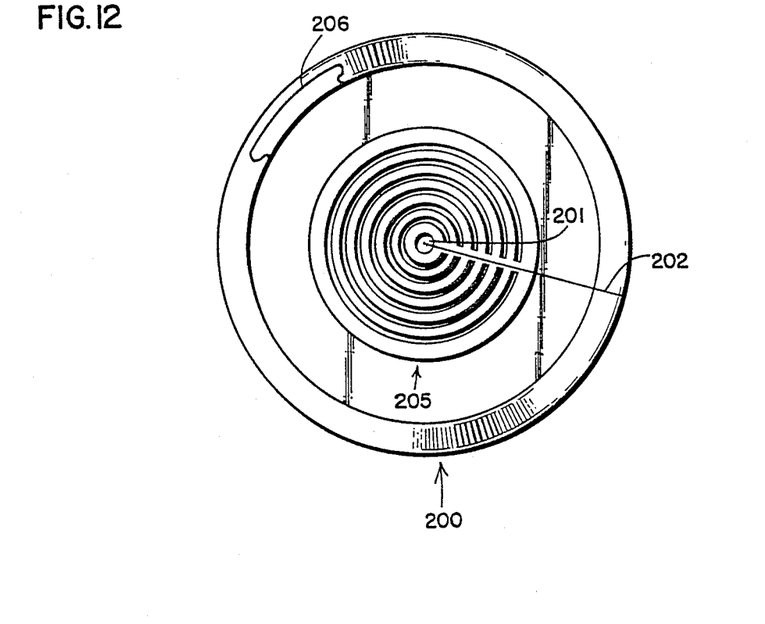
FIG. 12 is an elevational view of an end cap member according to an alternate embodiment shown in the parent application.

In FIGS. 9, 10 and 11 analogous views of the right member 40 are presented. It is noted that the right member 40, for example, includes: mounting ear 26; bores 90 and 105; cut lines or slits 150 and 151; cut-out auxiliary bores 154; annular recesses 155; and similar features to member 39.

One feature is particularly worthy of note, with respect to the two members 39 and 40. FIGS. 6 and 9 reveal that the slits of overlapping bores 50 and 90, i.e. cut lines 133 and 150, do not extend at the same angle and in an overlapping relationship to one another. That is, they are non-coplanar and do not overlap when the two sections 39 and 40 are mated, FIG. 4. Rather, they extend at angles to one another and preferably do not cross. This is advantageous, as it minimizes the likelihood of there forming a leak along the slits which can extend completely through the assembly 19, FIG. 4. It is noted, however, that since the cut lines 133 and 150 are generally directed toward the centers of bores 50 and 90, there is some small amount of overlap in the region immediately adjacent the central axis of the bores, but not when the bores are formed and the cable is passed through the bores. In this manner, the embodiment of FIGS. 13-16, described below, distinguishes. It will be understood that a similar arrangement may be used with respect to slits 140 and 151, of bores 51 and 105 respectively, as is used for cut lines 133 and 150, of bores 50 and 90.

It will also be understood from the descriptions above that an overall arrangement formed in two sections is preferred. First, advantages result with respect to the slits, as previously described. That is, there is little likelihood of a leak occurring completely throughout the arrangement, along the slits, since the slits are circumferentially spaced in the separate and nonoverlapping halves or segments. Further, the ridge arrangement, having a vertical (transverse) wall separated into alternating segments offset from one another, is relatively readily achieved in an arrangement formed from two halves, whereas it might be more difficult to mold in a single-piece arrangement. Also, a relatively thick overall arrangement can be provided in a manner that can still be readily flexed or twisted (as separate halves) about the cut lines, for mounting upon a cable or the like.

It is previously been explained that advantages to end cap arrangements according to the present disclosure may be provided in arrangements other than those having two bores extending therethrough. This is exemplified by arrangement 200, depicted in an alternate embodiment of FIG. 12. Arrangement 200 includes a single central bore 201 with a single slit 202, and a plurality of alternating ridges and troughs, or ridge/trough arrangement 205, according to the present invention. It is also noted that mounting ear 206 is depicted.

The Advantageous Embodiments of FIGS. 13-16

Figures 13, 14, 15, 16:
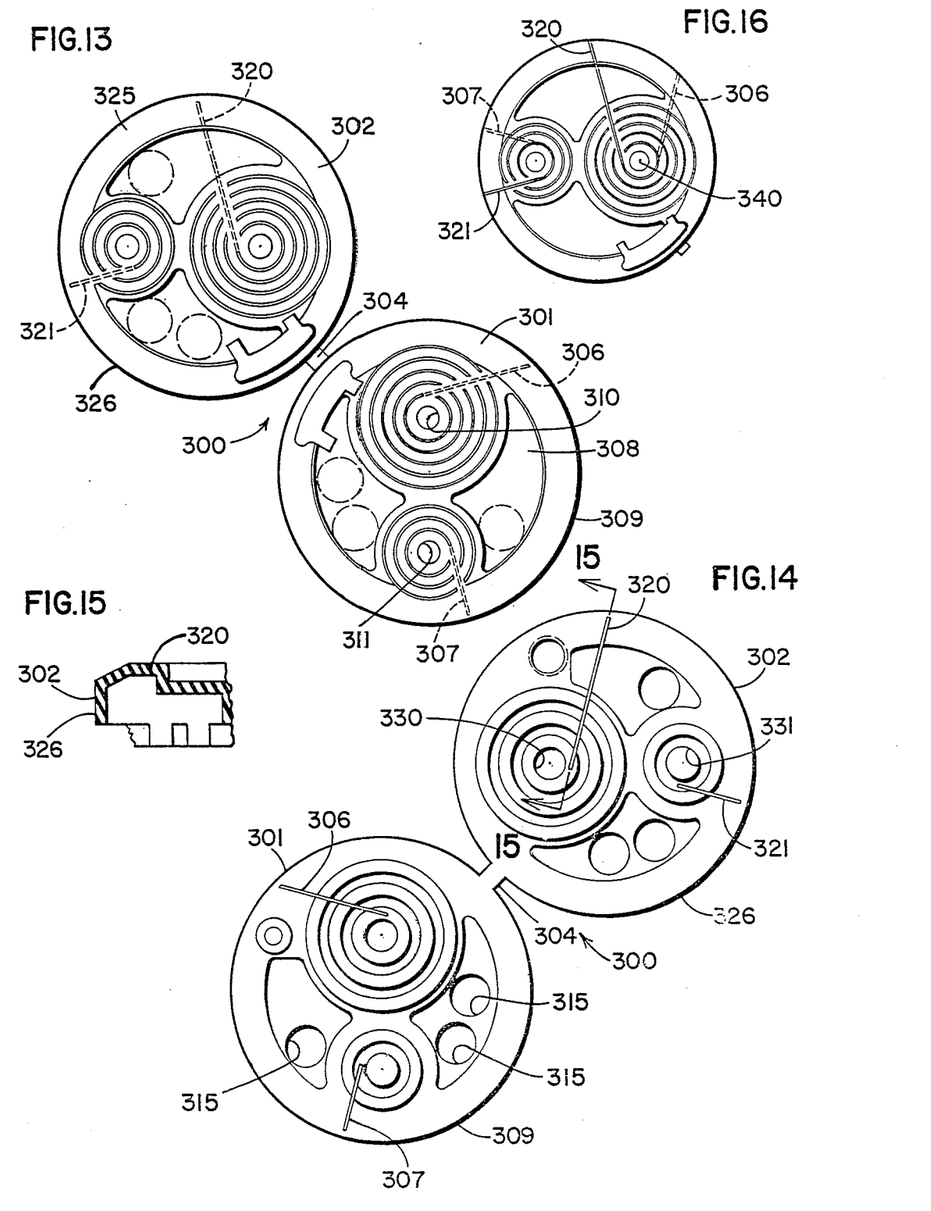
FIG. 13 is a front view of a pair of end cap members of an end cap arrangement according to the present invention.
FIG. 14 is a rear plan view of the pair of end cap members depicted in FIG. 13.
FIG. 15 is an enlarged fragmentary cross-section view taken generally along line 15—15, FIG. 14.
FIG. 16 is a front plan view of the pair of end cap members depicted in FIGS. 13 and 14 shown assembled for use, with phantom lines indicating portions hidden from view.

In FIGS. 13-16, advantageous embodiments are depicted. Referring to FIG. 13, an end cap arrangement 300 is shown comprising first and second end cap members 301 and 302 respectively. In FIG. 13, members 301 and 302 are shown unassembled, that is not nested with one another for mounting in cooperation with cables or the like. Members 301 and 302 are shown attached to one another by means of a connector 304. The connector 304 may be molded along with members 301 and 302, thus providing a convenient association between engagable pairs of end cap members 301 and 302.

Member 301 is generally analogous to member 39 depicted in FIGS. 6 and 7. The orientation of member 301 shown in FIG. 13 is analogous to the orientation of member 39 shown in FIG. 6.

In FIG. 14, unassembled end cap member 300 is depicted from a reverse side of that shown in FIG. 13. More specifically, the view of member 301 in FIG. 14 is analogous to that shown from member 39 in FIG. 7.

Again, member 301 is generally analogous to member 39, however there are some significant differences which lead to advantage. In particular, and referring to FIG. 14, while member 39 FIG. 7 has complete slits 133 and 140, member 301 has troughs or slots 306 and 307 respectively. Slots 306 and 307 differ from slits 133 and 140 of FIG. 7, in two significant manners. First, the slots 306 and 307 do not extend completely through member 301. Rather, they extend to a position adjacent to, but spaced from, the cap member outer surface 308, FIG. 13. This is suggested by the phantom lines for these features in FIG. 13. Slots 306 and 307 are also terminate at a position adjacent to, but spaced from, the outer periphery 309 of member 301.

In general, slots 306 and 307 provide guides for the cutting of complete slits through member 301, to facilitate mounting on a cable or the like in a manner analogous to that previously described for the embodiment of FIGS. 6 and 7. That is, after molding and before mounting, slots 306 and 307 can be readily converted to slits.

Advantages, however, result from the slots 306 and 307. In particular, the embodiment of FIGS. 6 and 7 would either be molded with no slit at all, or with the complete slits therein. If molded with no slit, the process of creating the slit in the field, with a knife or the like, could be relatively difficult especially if a high degree of accuracy were desired. On the other hand, slots 306 and 307 provide a guide for cutting, and also provide for a relatively thin area to be cut and thus facilitate the process.

Also, if the arrangement of FIGS. 6 and 7 were molded with slits 133 and 140 formed therein during molding, it is foreseen that a relatively wide slit could result, with less effective sealing. Further, the slit would be complete even if the associated bore 50 or 51 were not used for a cable.

Referring into FIGS. 13 and 14, it is noted that the slots 306 and 307 of member 301 do not extend directly toward the centers of bore sections 310 and 311. Rather, the slots 306 and 307 extend somewhat off-set from bore sections 310 and 311 respectively. In particular, they are directed toward opposite sides of the bore sections 310 and 311. Advantages from this arrangement will be discussed at further detail below.

Except for the above-noted differences, member 301 may be substantially identical to member 39, FIG. 6. In particular, the general features described with respect to member 39, FIG. 6, are utilized for the arrangement of member 301, and a description of them is not repeated herein.

Similarly, member 302, FIGS. 13 and 14 is generally analgous to member 40, FIGS. 9 and 10. Again, member 302 differs in that instead of having slits member 302 is generally formed with slots 320 and 321 therein. Slots 320 and 321 terminate adjacent to but spaced from outer surface 325, FIG. 13. Further, slots 320 and 321, FIG. 14, terminate adjacent to but spaced from the outer circumferential area 326 of member 302.

The same types of advantages can be obtained from slots 320 and 321, for member 302, as are obtained for slots 306 and 307 for member 301.

By way of reference, it is noted that the view of member 302, FIG. 13, is generally analogous to the view of member 40 in FIG. 9, and the view of member 302 in FIG. 14 is generally analogous to the view of member 40 in FIG. 10.

It is also noted that slots 320 and 321, FIG. 14 do not extend directly toward the center of bore sections 330 and 331 respectively. Rather, the extensions of slots 320 and 321 are off-set somewhat from the centers of bore sections 330 and 331.

Referring to FIG. 16, advantages from the off-set extensions of the slots, which ultimately may become slits during use, away from the centers of the bores will be understood. In particular, in FIG. 16 members 301 and 302 are shown mated with one another, in a manner analogous to members 39 and 40, FIG. 4. The orientation of FIG. 16 is with member 302 facing the viewer. It will be understood that the slots 306, 307, 320 and 321 have been completely cut into slits for FIG. 16, for mounting on a cable or the like. It is further noted that no two slots (or slits) overlap one another, even at their termini. That is, slot 306 does not cross or even terminate near slot 320 and slot 307 does not cross or even terminate near slot 321. That is, the slots are directed toward opposite sides of the bore axis for bore sections 310 and 330, similarly for bore sections 322 and 331, and generally tangential to an inner trough. This is due to the fact that not only were the slots not directed toward the centers of the bore sections, but also each slot was oriented toward its associated bore section such that when mated with another end cap member the slots would extend generally toward opposite sides of the associated trough or ring. It is noted that for the embodiment shown, this was accomplished by extending the slots, for example slots 306 and 320, of any associated pair of bores, (for example bores 310 and 330) tangentially toward opposite sides of the center most portion of the bore, i.e. point 340 FIG. 16.

It is to be understood that while detailed descriptions of the preferred embodiments have been illustrated and described, the invention is not to be limited to the arrangement of parts and specific features herein described and shown. Rather, the descriptions are merely of exemplary embodiments of the invention, which may be embodied in various forms.

What is claimed and desired to be secured by Letters Patent is as follows:

1. An end cap arrangement for sealing an end of a splice closure about at least one cable member directed therein; said end cap arrangement comprising:
   (a) a wall member having first and second opposite faces and having an outer peripheral edge and at least one longitudinal cable bore; the at least one cable bore being defined by a plurality of substantially concentric ring members spaced from one another by transverse wall sections;
      (i) said transverse wall sections being positioned generally centrally along a longitudinal extension of said ring members and the at least one cable bore to define, with said ring members, a ridge/trough arrangement of alternating ridges and troughs; ridges defined thereby being directed in both of opposite longitudinal directions from said transverse wall sections;
      (ii) transverse wall sections on opposite sides of each associated ring member being longitudinally spaced from one another to form an undulating central wall extending through said concentric ring members and substantially normal thereto; and
   (b) mounting means constructed and arranged to facilitate mounting said end cap arrangement on a cable member directed through said at least one cable bore; said mounting means including a slot arrangement communicating partially through said wall member, from a position adjacent to, but spaced from, said wall member outer peripheral edge and toward said at least one cable bore; said slot arrangement also communicating partially through said wall member between said first and second opposite faces.

2. An end cap arrangement according to claim 1 including:
   (a) anchoring means constructed and arranged to selectively retain said end cap arrangement within a splice closure; said anchoring means including first and second mounting ears projecting outwardly, in opposite directions, from said wall member.

3. An end cap arrangement according to claim 1 wherein:
   (a) the at least one cable bore is occluded by a cut-out portion of material.

4. An end cap arrangement according to claim 1 wherein:
   (a) said transverse wall sections define first and second sets of transverse wall members;
      (i) all members of said first set of transverse wall members being aligned substantially co-planar, in a first plane substantially normal to a longitudinal extension of said ring members;
      (ii) all members of said second set of transverse wall members being aligned substantially co-planar, in a second plane substantially normal to a longitudinal extension of said ring members, and longitudinally spaced from said first plane;
   (b) whereby said undulating central wall is defined by said first and second sets of transverse wall members.

5. An end cap arrangement according to claim 4 wherein:
   (a) said wall member is defined by first and second end cap members positioned against one another, each end cap member having an outer face collectively defining said wall member opposite outer faces; and, each end cap member including a portion of said at least one wall member bore therein.

6. An end cap arrangement according to claim 5 wherein:
(a) an interface line separating said first end cap member from said second end cap member extends generally centrally through said undulating wall.

7. An end cap arrangement according to claim 5 wherein:
(a) said slot arrangement includes a slot in each of said end cap members; a first slot in said first end cap member extending from a position adjacent to and spaced from an outer edge of said first end cap member to a portion of said at least one cable bore therein, said first slot being spaced from said first end cap member outer face; and, a
second slot in said second end cap member extending from a position adjacent to and spaced from an outer edge of said second end cap member to a portion of said at least one cable bore therein; said second slot being spaced from said second end cap member outer face;
(i) said first and second slots being aligned non-coplanar with respect to one another, when said first and second end cap members are operationally positioned with respect to one another.

8. An end cap arrangement according to claim 7 wherein said first and second slots are generally directed toward opposite sides of the axis of said well member at least one cable bore.

9. An end cap arrangement according to claim 5 wherein:
(a) said slot arrangement includes a slot in each of said end cap members; said slots being oriented such that when said end cap members are operationally oriented to form said wall member:
(i) said slots each terminate at points adjacent to, but spaced from, an outer peripheral surface of said wall member;
(ii) said slots extend from said points adjacent to, but spaced from, said outer peripheral surface of said wall member toward opposite sides of the axis of said wall member at least one cable bore;
(iii) said points adjacent to, but spaced from, said outer peripheral surface being radially and axially spaced from one another; and
(iv) said slots extend in non-crossing paths;
(b) whereby when said slots are cut into slits, during use a continuous leak path through said wall member involving the slits, is inhibited.

10. An end cap arrangement according to claim 1 wherein:
(a) said wall member is defined by first and second end cap members positioned against one another, each end cap member having an outer face collectively defining said wall member opposite outer faces; and, each end cap member including a portion of said wall member at least one cable bore therein.

11. An end cap arrangement according to claim 10 wherein:
(a) an interface line separating said first end cap member from said second end cap member extends generally centrally through said undulating wall, and defines an interlocking interface between said first and second end cap members.

12. An end cap arrangement according to claim 11 wherein:
(a) said slot arrangement includes a slot in each of said end cap members; a first slot in said first end cap member extending from a position adjacent to, and spaced from, an outer edge of said first end cap member through to a portion of said at least one cable bore therein, said first slot being spaced from said first end cap member outer face; and, a second slot in said second end cap member extending from a position adjacent to but spaced from an outer peripheral edge of said second end cap member toward a portion of said at least one cable bore therein, said second slot being spaced from said second end cap member outer face;
(i) said first and second cable slots being aligned non-coplanar with respect to one another, when said first and second end cap members are operationally positioned with respect to one another.

13. An end cap arrangement according to claim 12 wherein said first and second slots are generally directed toward opposite sides of said wall member at least one cable bore.

14. An end cap arrangement according to claim 12 including:
(a) at least one auxiliary line cut-out bore therein.

15. An end cap arrangement for sealing an end of a splice closure about at least one cable member directed therein; said end cap arrangement comprising:
(a) a wall member having first and second opposite faces and having an outer peripheral edge and at least two longitudinal cable member bores; the at least two cable member bores each being separately defined by a plurality of substantially concentric ring members spaced from one another by transverse wall sections;
(i) said transverse wall sections associated with the at least two cable member bores each being oriented generally centrally along a longitudinal extension of said ring member, of said associated bore, to define, with said ring members, a ridge/trough arrangement for each of the at least two cable member bores comprising alternating ridges and troughs; ridges defined thereby being directed in both of opposite longitudinal directions from said transverse wall sections;
(ii) transverse wall section, associated with each of the at least two cable member bores, on opposite sides of each associated ring member being longitudinally spaced from one another to form an undulating central wall extending through said concentric ring members substantially normal thereto; and,
(b) mounting means constructed and arranged to facilitate mounting said end cap arrangement on cable members directed through said at least two cable member bores; said mounting means including a slot arrangement in association with each of the at least two cable member bores; each slot arrangement communicating partially through said wall member from a position adjacent to, but spaced from, said wall member outer peripheral edge and toward an associated one of the at least two cable member bores; said slot arrangements each also communicating partially through said wall member without communication with said first and second opposite faces.

16. An end arrangement according to claim 15 including:
(a) anchoring means constructed and arranged to selectively retain said end cap arrangement within a splice closure; said anchoring means including first and second mounting ears projecting outwardly, in opposite directions, from said wall member.

17. An end cap arrangement according to claim 16 wherein:
   (a) each one of the at least two cable member bores is occluded by a cut-out portion of material.

18. An end cap arrangement according to claim 15 wherein:
   (a) said transverse wall sections of each one of the at least two cable member bores define first and second sets of transverse wall members;
      (i) all members of said first set of transverse wall members being aligned substantially co-planar, in a first plane substantially normal to a longitudinal extension of said ring members; and,
      (ii) all members of said second set of transverse wall members being aligned substantially co-planar, in a second plane substantially normal to a longitudinal extension of said ring members, and longitudinally spaced from said first plane;
   (b) whereby said undulating central wall is defined by said first and second sets of transverse wall members.

19. An end cap arrangement according to claim 18 wherein:
   (a) said wall member is defined by first and second end cap members positioned against one another.

20. An end cap arrangement according to claim 19 wherein:
   (a) an interface line separating said first end cap member from said second end cap members extends generally centrally through said undulating wall.

21. An end cap arrangement according to claim 20 wherein:
   (a) each slot arrangement in association with each one of the at least two cable bores includes a slot in each of said end cap members; each slot in said first end cap member, and associated with one of the at least two cable member bores therein, extending from a position adjacent to but spaced from an outer edge of said first end cap member to a portion of said associated one of the at least two cable member bores; and, each slot in said second end cap member, and associated with one of the at least two cable member bores therein, extending from a position adjacent to but spaced from an outer edge of said second end cap member to a portion of said associated one of the at least two cable member bores;
      (i) no two slots in association with each bore being co-planar with respect to one another when said first and second end cap members are operationally positioned with respect to one another.

22. An end cap arrangement according to claim 15 wherein:
   (a) each one of the at least two cable member bores is defined by a different number of substantially concentric ring members.

23. An end cap arrangement according to claim 15 including only two cable member bores.

24. An end cap arrangement for sealing an end of a splice closure about at least one cable member directed therein; said end cap arrangement comprising:
   (a) a wall member having first and second opposite faces and having an outer peripheral edge and at least one longitudinal cable bore; the at least one cable bore being defined by a plurality of substantially concentric ring members spaced from one another by transverse wall sections; and,
   (b) mounting means constructed and arranged to facilitate mounting said end cap arrangement on a cable member directed through said at least one cable bore; said mounting means including a slot arrangement communicating partially through said wall member, from a position adjacent to, but spaced from, said wall member outer peripheral edge and toward said at least one cable bore; said slot arrangement also communicating partially through said wall member between said first and second opposite faces.

25. An end cap arrangement according to claim 24 including:
   (a) anchoring means constructed and arranged to selectively retain said end cap arrangement within a splice closure; said anchoring means including first and second mounting ears projecting outwardly, in opposite directions, from said wall member.

26. An end cap arrangement according to claim 24 wherein:
   (a) the at least one cable bore is occluded by a cut-out portion of material.

27. An end cap arrangement according to claim 24 wherein:
   (a) said wall member is defined by first and second end cap members positioned against one another, each end cap member having an outer face collectively defining said wall member opposite outer faces; and, each end cap member including a portion of said at least one wall member bore therein.

28. An end cap arrangement according to claim 27 wherein:
   (a) an interface line separating said first end cap member from said second end cap member extends generally centrally through said undulating wall.

29. An end cap arrangement according to claim 27 wherein:
   (a) said slot arrangement includes a slot in each of said end cap members; a first slot in said first end cap member extending from a position adjacent to and spaced from an outer edge of said first end cap member to a portion of said at least one cable bore therein, said first slot being spaced from said first end cap member outer face; and, a second slot in said second end cap member extending from a position adjacent to and spaced from an outer edge of said second end cap member to a portion of said at least one cable bore therein; said second slot being spaced from said second end cap member outer face;
      (i) said first and second slots being aligned non-coplanar with respect to one another, when said first and second end cap members are operationally positioned with respect to one another.

30. An end cap arrangement according to claim 29 wherein said first and second slots are generally directed toward opposite sides of the axis of said wall member at least one cable bore.

31. An end cap arrangement according to claim 27 wherein:
   (a) said slot arrangement includes a slot in each of said end cap members; said slots being oriented such that when said end cap members are operationally oriented to form said wall member:

(i) said slots each terminate at points adjacent to, but spaced from, an outer peripheral surface of said wall member;
(ii) said slots extend from said points adjacent to, but spaced from, said outer peripheral surface of said wall member toward opposite sides of the axis of said wall member at least one cable bore;
(iii) said points adjacent to, but spaced from, said outer peripheral surface being radically and axially spaced from one another; and,
(iv) said slots extend in non-crossing paths;
(b) whereby when said slots are cut into slits, during use a continuous leak path through said wall member involving the slits, is inhibited.

* * * * *